(12) United States Patent
Wang

(10) Patent No.: US 10,356,140 B2
(45) Date of Patent: Jul. 16, 2019

(54) METHOD, APPARATUS AND SYSTEM FOR PRESENTING MOBILE MEDIA INFORMATION

(71) Applicant: TENCENT TECHNOLOGY (SHENZHEN) COMPANY LIMITED, Shenzhen, Guangdong (CN)

(72) Inventor: Huayong Wang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 770 days.

(21) Appl. No.: 14/836,760

(22) Filed: Aug. 26, 2015

(65) Prior Publication Data

US 2015/0365451 A1 Dec. 17, 2015

Related U.S. Application Data

(63) Continuation of application No. PCT/CN2014/071995, filed on Feb. 12, 2014.

(30) Foreign Application Priority Data

Feb. 27, 2013 (CN) .......................... 2013 1 0061966

(51) Int. Cl.
  *G06F 15/16* (2006.01)
  *H04L 29/06* (2006.01)
  (Continued)

(52) U.S. Cl.
  CPC .......... *H04L 65/4069* (2013.01); *G06F 3/165* (2013.01); *G06F 16/686* (2019.01); *G11B 27/10* (2013.01); *H04L 67/10* (2013.01)

(58) Field of Classification Search
  CPC ..... H04L 65/4069; H04L 67/10; G06F 3/165; G06F 17/30752; G11B 27/10
  See application file for complete search history.

(56) References Cited

U.S. PATENT DOCUMENTS

2002/0049981 A1* 4/2002 Tzou .................... G11B 27/105
  725/105
2008/0074493 A1 3/2008 Laughlin
  (Continued)

FOREIGN PATENT DOCUMENTS

CN 1609837 A 4/2005
CN 102037487 A 4/2011
  (Continued)

OTHER PUBLICATIONS

International Search Report for International App. No. PCT/CN2014/071995 dated May 19, 2014.
  (Continued)

*Primary Examiner* — Suraj M Joshi
*Assistant Examiner* — Jaren Means
(74) *Attorney, Agent, or Firm* — Morgan, Lewis & Bockius LLP

(57) ABSTRACT

A solution for presenting mobile media information is provided, including: collecting audio data associated with mobile media information, transmitting the audio data to a mobile voice platform which stores the audio data and generates a tag corresponding to the audio data, obtaining the tag from the mobile voice platform, inserting the tag into a predetermined position in the mobile media information, presenting the mobile media information with the tag being inserted into, invoking the audio data corresponding to the tag from the mobile voice platform according to a trigger operation issued when a user browses the mobile media information, and playing the invoked audio data.

20 Claims, 5 Drawing Sheets

(51) Int. Cl.
  *G06F 3/16* (2006.01)
  *G11B 27/10* (2006.01)
  *H04L 29/08* (2006.01)
  *G06F 16/68* (2019.01)

(56) References Cited

U.S. PATENT DOCUMENTS

| | | | |
|---|---|---|---|
| 2008/0195664 A1* | 8/2008 | Maharajh | G06Q 10/10 |
| 2009/0228493 A1* | 9/2009 | Kephart | G06Q 10/00 |
| 2009/0294538 A1 | 12/2009 | Wihlborg et al. | |
| 2011/0173214 A1* | 7/2011 | Karim | G06F 16/489 |
| | | | 707/754 |
| 2012/0253492 A1 | 10/2012 | Andrews | |

FOREIGN PATENT DOCUMENTS

| | | | |
|---|---|---|---|
| CN | 102136199 A | 7/2011 | |
| CN | 102479216 A | 5/2012 | |
| CN | 102867039 A | 1/2013 | |

OTHER PUBLICATIONS

International Preliminary Report on Patentability for International App. No. PCT/CN2014/071995 dated Sep. 11, 2015.

Chinese Office Action for Application No. 2013100619661 dated Nov. 16, 2016, and an English concise explanation of relevance thereof.

* cited by examiner

METHOD, APPARATUS AND SYSTEM FOR PRESENTING MOBILE MEDIA INFORMATION

CROSS REFERENCE TO RELATED APPLICATIONS

The application is a continuation of International Application No. PCT/CN2014/071995 filed on Feb. 12, 2014, which claims the priority of Chinese Patent Application No. 201310061966.1, filed on Feb. 27, 2013, the disclosure of which is incorporated herein in its entirety by reference.

TECHNICAL FIELD

The present application relates to a field of information processing, and in particular to a method, apparatus and system for presenting mobile media information.

BACKGROUND

With the rapid development of computer technology and network technology, Internet technology is increasingly playing a role in people's daily life, study and work. Furthermore, with the development of Mobile Internet, the Internet is also developing toward mobilization.

Along with the deep development of the Mobile Internet, network media are also developing toward mobilization. There are currently already applications (APPs) for mobile media existing on mobile terminals. However, these applications typically simply provide graphics and texts of news information for users in a manner of combining images and textual information, such that immediacy and interactivity of the mobile media is not strong.

SUMMARY

The present application provides a method for presenting mobile media information, and the method includes collecting audio data associated with mobile media information, transmitting the audio data to a mobile voice platform which stores the audio data and generates a tag corresponding to the audio data, obtaining the tag from the mobile voice platform, inserting the tag into a predetermined position in the mobile media information, presenting the mobile media information with the tag being inserted into, invoking the audio data corresponding to the tag from the mobile voice platform according to a trigger operation issued when a user browses the mobile media information, and playing the invoked audio data.

The present application further provides an apparatus for presenting mobile media information which includes an audio data collection unit, a mobile media presentation unit and an audio data play unit, where the audio data collection unit is to collect audio data associated with mobile media information and transmit the audio data, the mobile media presentation unit is to obtain a tag corresponding to the audio data, insert the tag into a predetermined position in the mobile media information, and present the mobile media information with the tag being inserted into, and the audio data play unit is to invoke the audio data corresponding to the tag from a mobile voice platform according to a trigger operation issued when a user browses the mobile media information and play the audio data.

The present application further provides a system for processing mobile voices which includes a mobile media information publication apparatus and a mobile voice processing apparatus, where the mobile media information publication apparatus is to collect audio data associated with mobile media information and transmit the audio data to the mobile voice processing apparatus, the mobile voice processing apparatus is to store the audio data and generate a tag corresponding to the audio data, and the mobile media information publication apparatus is to obtain the tag from the mobile voice processing apparatus, insert the tag to a predetermined position in the mobile media information, present the mobile media information with the tag being inserted into, invoke the audio data corresponding to the tag from the mobile voice processing apparatus according to a trigger operation issued when a user browses the mobile media information and play the audio data.

The present application further provides an apparatus for processing mobile voices which includes an audio data storage unit, an audio data tag generation unit and an audio data transmission unit, where the audio data storage unit is to receive audio data associated with mobile media information and store the audio data, the audio data tag generation unit is to generate a tag corresponding to the audio data and transmit the tag which is inserted into a predetermined position in the mobile media information and presented together with the mobile media information, and an audio data transmission unit is to receive a search request for audio data carrying the tag, search out the audio data corresponding to the tag according to the search request, and transmit the searched-out audio data.

DETAILED DESCRIPTION

Figure 1:
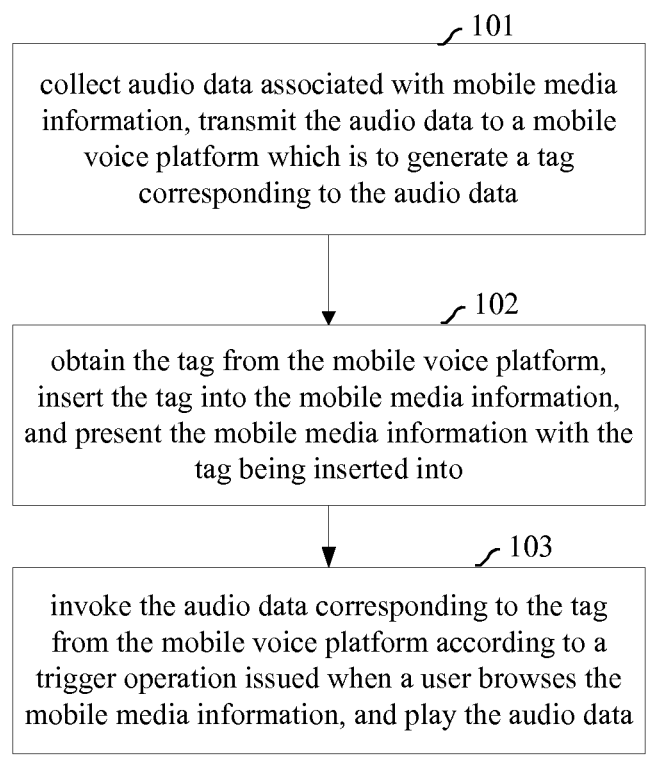
FIG. 1 is a flow diagram of a method for presenting mobile media information according to an example of the present application.

Examples will now be described more fully with reference to the accompanying drawings.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term "module" or "unit" may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

In examples of the present application, technical solutions that combine mobile media information with a mobile voice platform are provided, making audio properly embedded in the mobile media information, thus improving the immediacy and interactivity of the mobile media.

FIG. 1 is a flow diagram of a method for presenting mobile media information according to an example.

As shown in FIG. 1, the method includes the followings:

Step 101: collect audio data associated with mobile media information, send the audio data to a mobile voice platform which stores the audio data and generates a tag corresponding to the audio data.

Here, the mobile media information may be various kinds of information to be published to users such as news information, traffic information, videos/movies, e-commerce information and etc. Also, the audio data associated with the mobile media information may be in multiple forms. The mobile information may include text media information, picture media information, video media information and/or audio media information etc.

In an example, the mobile media information is report information regarding news events, and the audio data associated with such mobile media information may be analysis information for media information, including audio information about news event principals, persons involved in news events, news event observers or news event analysts etc. For example, audio data of an event principal of the mobile media information is collected, audio data of a person involved in an event of the mobile media information is collected, audio data of an event observer of the mobile media information, and/or audio data of an event analyst of the mobile media information is collected.

In an example, the mobile media information is report information about traffic information, and the audio data associated with the mobile media information may be audio of a traffic broadcaster's reporting the traffic information, audio of a weather forecast broadcaster's reporting weather forecast information, or instant traffic report audio of actual road & pedestrian etc.

In an example, the mobile media information is information about videos/movies, and the audio data associated with the mobile media information may be audio of a video/movie director's introducing a film, audio of a video/movie actor's introducing his experience in the capture of a film, or audio of reporting a movie viewer's impression on a file etc.

In an example, the mobile media information is information about e-commerce, and the audio data associated with the mobile media information may be audio of an e-commerce seller's introducing a product, or audio of a buyer's reporting his impression on a purchased commodity etc.

In examples of the present application, various ways can be used in collecting the audio data associated with the mobile media information. For example, a mobile voice platform which is currently widely used may be used to collect the audio data associated with the mobile media information. The mobile voice platform includes, but is not limited to, various mobile voice communication tools such as Wechat or etc. After the audio data associated with the mobile media information is collected, the audio data may be stored in a mobile voice database of the mobile voice platform and a tag corresponding to the audio data is generated.

The tag may uniquely identify audio data. The tag may be generated in various ways such as the way of generating the tag uniquely identifying the audio data based on the order of numbers, letters or the like or based the content of the mobile media information.

On the condition that the mobile media information is report information regarding a news event, the tag uniquely identifying the audio data may be generated based on the title of the news event, occurrence time thereof, or other information related to the content of the mobile media information. On the condition that the mobile media information is report information about traffic information, the tag uniquely identifying the audio data may be generated based on a road name, publication time of the traffic information or other information related to the content of the mobile media information. On the condition that the mobile media information is information about e-commerce, the tag uniquely identifying the audio data may be generated based on the commodity's code or other information related to the content of the mobile media information. On the condition that the mobile media information is information about videos/movies, the tag uniquely identifying the audio data may be generated based on a director's name, a leading actor's name or other information related to the content of the mobile media information.

It can be recognized by those skilled in the art that although specific examples of the mobile media information and the audio data associated therewith have been listed above, those listed are merely exemplary, but not intended to limit the application scope of the examples of the present application.

Here, the mobile device that presents the mobile media information may include but is not limited to a functional cell phone, a smart phone, a palmtop computer, a personal computer (PC), a tablet computer or a personal digital assistant (PDA) or etc.

It can be recognized by those skilled in the art that although specific examples of the mobile device have been listed above, those listed are merely for the purpose of description, but not intended to limit the protection scope of the examples of the present application.

The operating system of the mobile device may be any smart terminal operating system which may include but is not limited to the operating system of Andorid, Palm OS, Symbian, Windows mobile, Linux, iPhone OS, Black Berry OS 6.0, Windows Phone series, or etc.

On the condition that the mobile device adopts the operating system of Andorid, the mobile device may be deployed with various versions of Andorid, including but not limited to Etongmu (Android Beta), Wind-up Robot (Android 1.0), Paper-Cup Cake (Android 1.5), Donut (Android 1.6), Muffins (Android 2.0/2.1), Frozen Yogurt (Android 2.2), Ginger Cookie (Android 2.3), Honeycomb (Android 3.0), Ice Cream Sandwich (Android 4.0), Jelly Bean (Jelly Bean, Android 4.1) or etc.

It can be recognized by those skilled in the art that although specific versions of the Android platform have been listed above, the operation system adopted in the examples of the present application is not limited to those listed and may be any version of Android-based software architecture other than those listed.

Step 102: obtain the tag of the audio data from the mobile voice platform, insert the tag to a predetermined position in the mobile media information, and present the mobile media information with the tag being inserted into.

After the body content of the mobile media information is edited and before the mobile media information is finally delivered to the user, an audio data tag may be inserted to a predetermined position in the mobile media information, and then the mobile media information with the audio data tag being inserted into is presented to the user. Here, the audio data tag may be presented to the user in various forms, e.g., the audio data tag is presented as an audio control around the mobile media information, and play time of the audio data is presented on the audio control.

Step 103: invoke the audio data corresponding to the audio data tag from the mobile voice platform according to a trigger operation issued when a user browses the mobile media information, and play the audio data.

During the user's browsing the mobile media information, the presence of the audio control can be found, then it is ready to capture the user's operation, and upon capturing the user's operation on the audio control, the audio data corresponding to the audio data tag is invoked from a mobile voice database and is played.

In an example of an application of a mobile terminal's financial App, access a news event of Vanke and insert a piece of Wechat audio of Wang Shi into this news event. In another example of an application of a mobile terminal's video App, access the video of "The Grandmaster" and insert Wechat audio of interview with a leading actor and movie critic or etc.

In an example, the method further include: collecting first audio commentary data of a user browsing the mobile media information, sending the first audio commentary data to the mobile voice database for storage, generating a tag corresponding to the first audio commentary data, inserting the tag of the first audio commentary data to a predetermined position in the mobile media information, presenting the mobile media information with the tag of the first audio commentary data being inserted into, invoking from the mobile voice database the first audio commentary data corresponding to the tage of the first audio commentary data tag, and playing the first audio commentary data, thereby enabling the user to record a voice comment during browsing the mobile media information.

In an example, the method further include: collecting second audio commentary data of a user listening to the audio data, sending the second audio commentary data to the mobile voice database for storage, generating a tag corresponding to the second audio commentary data, inserting the tag of the second audio commentary data to a predetermined position in the mobile media information, presenting the mobile media information with the tag of the second audio commentary data being inserted into, invoking from the mobile voice database the second audio commentary data corresponding to the tag of the second audio commentary data, and playing the second audio commentary data, thereby enabling the user to record a voice comment during listening to the audio data.

In an example, the method further include: collecting third audio commentary data of a user listening to the first audio commentary data, sending the third audio commentary data to the mobile voice database for storage, generating a tag corresponding to the third audio commentary data, inserting the tag of the third audio commentary data to a predetermined position in the mobile media information, presenting the mobile media information with the tag of the third audio commentary data being inserted into, invoking from the mobile voice database the third audio commentary data corresponding to the tag of the third audio commentary data, and playing the third audio commentary data, thereby enabling the user to record a voice comment during listening to the first audio commentary data.

In an example, the method further include: collecting fourth audio commentary data of a user listening to the second audio commentary data, sending the fourth audio commentary data to the mobile voice database for storage, generating a tag corresponding to the fourth audio commentary data, inserting the tag of the fourth audio commentary data to a predetermined position in the mobile media information, presenting the mobile media information with the tag of the fourth audio commentary data being inserted into, invoking from the mobile voice database the fourth audio commentary data corresponding to the tag of the fourth audio commentary data, and playing the fourth audio commentary data, thereby enabling the user to record a voice comment during listening to the second audio commentary data.

The aforementioned first audio commentary data, the second audio commentary data, the third audio commentary data and the fourth audio commentary data are all audio data, so they may be called second audio data, third audio data, fourth audio data and fifth audio data respectively, and the present application does not limit the name of the audio data.

In an example, an audio recording application of the mobile terminal collects the audio data associated with the mobile media information. The audio recording application of the mobile terminal uses an open interface of the mobile voice platform to store the audio data in the mobile voice database of the mobile voice platform, and to generate the tag corresponding to the audio data based on the content of the mobile media information, e.g., the title of the mobile media information, the spokesman of the audio data, recording time of the audio data and etc.

In an example below, the technical solution is implemented on the combination of a Wechat platform and a mobile media App. In a particular application, the implementation of the example includes two parts, one part is implemented on the mobile media App, and another part is implemented on the Wechat platform. In the part implemented on the mobile media App, it is needed to insert a piece of Wechat audio into the mobile media information, while in the part implemented on the Wechat platform, it involves delivering audio recorded by the user to a designated background which is to store the audio.

Figure 2:
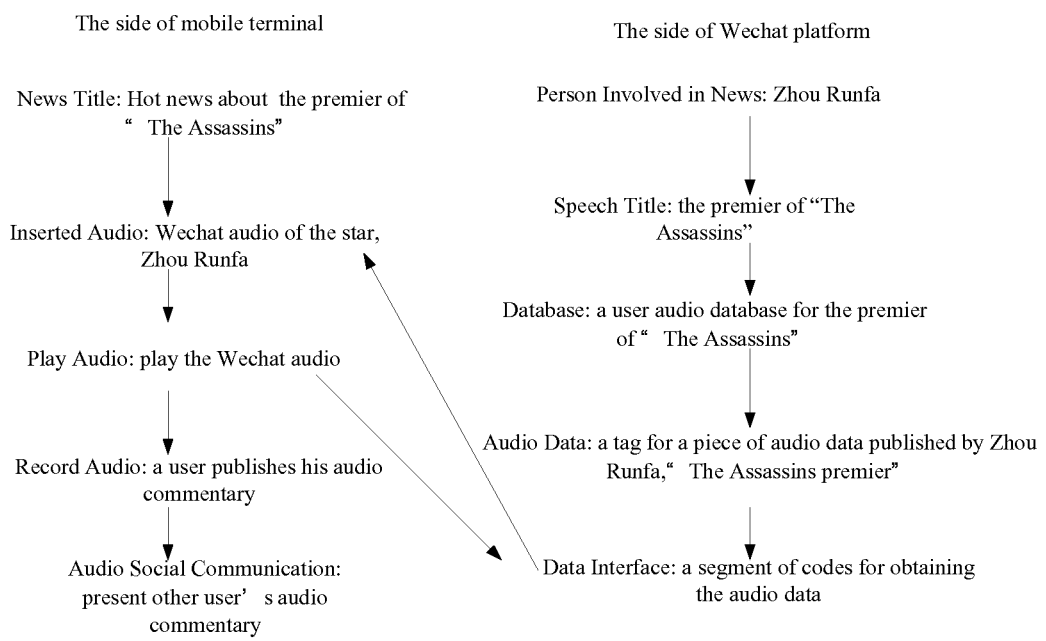
FIG. 2 is a diagram illustrating processing on mobile media information according to an embodiment of the present invention.
Figure 3:
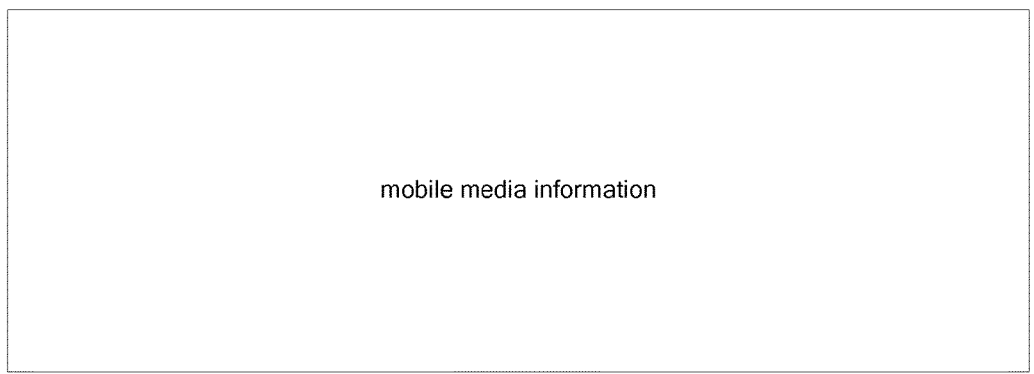
FIG. 3 is a diagram illustrating displaying of mobile media information according to an example of the present application.

FIG. 2 is a diagram of processing on the mobile media information according to an example of the present application. FIG. 3 is a diagram of displaying of the mobile media information according to an example of the present application.

As shown in FIG. 2, at the side of the mobile media App, the mobile media App may first obtain a target user's voice data through the Wechat platform when the target user speaks actively for an event or is invited to an interview, where the target user's voice data is the audio data that is public to the users but not the audio data of private communications, and the target user's voice data is stored in a database of the Wechat platform with a tag such as a tag of "The Assassins premier". When the mobile media App prepares to publish a mobile media information content such as the report or video of "The Assassins premier", the mobile media App searches and finds the corresponding target user's voice data through an open interface provided by the Wechat platform, obtains a corresponding parameter code, inserts the corresponding parameter code to a predetermined position in the mobile media information content, and publishes the mobile media information content. Then, upon the user clicking an audio play button, the corresponding parameter code invokes corresponding voice data from the Wechat platform and plays the voice data.

When the user clicks a "talk" button configured in the mobile media information content, the mobile device automatically closes the sound of "music", "Movie" or etc., being played, and records the user's voice. When the user releases the "talk" button, the mobile device processes and encodes the recorded audio. The mobile media App or the Wechat platform inserts into the audio data a tag such as the title of the current mobile media information content title, "The Assassins premier", and stores the recorded audio data and the tag thereof in the background of the Wechat platform.

In the above example, the technical solution is implemented on the combination of a Wechat platform and a mobile media App. In practice, the mobile voice platform may be in various forms but not limited to the Wechat platform, and it may be any mobile voice platform with an open interface.

An example of the present application also proposes an apparatus for presenting mobile media information.

Figure 4:
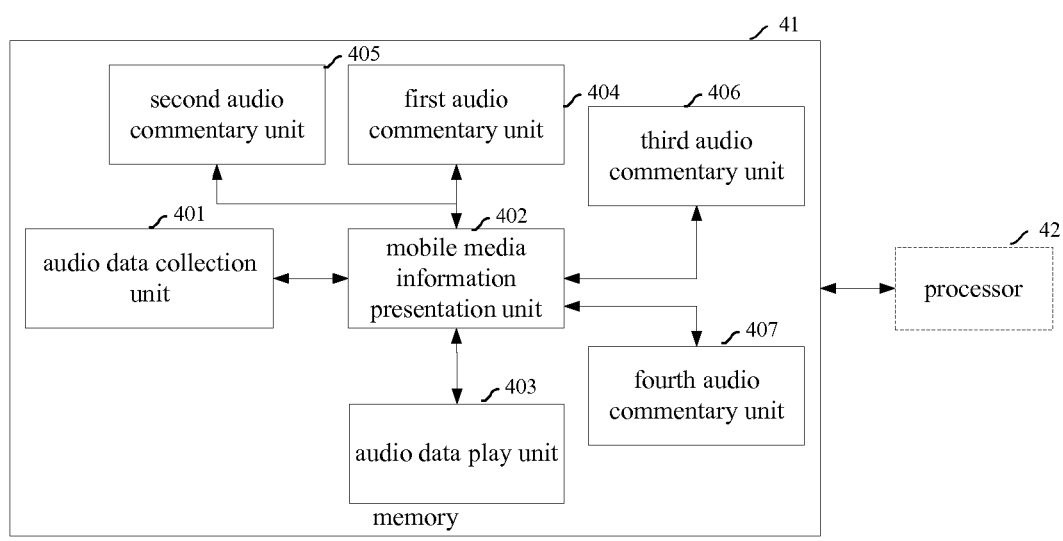
FIG. 4 is a structural diagram of an apparatus for presenting mobile media information according to an example of the present application.

FIG. 4 is a structural diagram of an apparatus for presenting mobile media information according to an example.

As shown in FIG. 4, the apparatus includes an audio data collection unit 401, a mobile media information presentation unit 402 and an audio data play unit 403.

The audio data collection unit 401 is to collect audio data associated with the mobile media information, and transmit the audio data.

The mobile media information presentation unit 402 is to obtain a tag corresponding to the audio data, insert the tag to a predetermined position in the mobile media information, and present the mobile media information with the tag being inserted into.

The audio data play unit 403 is to invoke the audio data corresponding to the tag according to a trigger operation issued when a user browses the mobile media information, and play the audio data.

In an example, a first audio commentary unit 404 is further included. The first audio commentary unit 404 is to collect first audio commentary data when the user browses the mobile media information, and transmit the first audio commentary data.

The mobile media information presentation unit 402 is further to obtain a tag of the first audio commentary data, insert the tag of the first audio commentary data to a predetermined position in the mobile media information, and present the mobile media information with the tag of the first audio commentary data being inserted into.

The audio data play unit 403 is further to invoke the first audio commentary data corresponding to the tag thereof, and play the first audio commentary data.

In an example, a second audio commentary unit 405 is further included.

The second audio commentary unit 405 is to collect second audio commentary data when the user listens to the audio data, and transmit the second audio commentary data.

The mobile media information presentation unit 402 is further to obtain a tag of the second audio commentary data, insert the tag of the second audio commentary data to a predetermined position in the mobile media information, and present the mobile media information with the tag of the second audio commentary data being inserted into.

The audio data play unit 403 is further to invoke the second audio commentary data corresponding to the tag thereof, and play the second audio commentary data.

In an example, a third audio commentary unit 406 is further included. The third audio commentary unit 406 is to collect third audio commentary data when the user listens to the first audio commentary data, and transmit the third audio commentary data.

The mobile media information presentation unit 402 is further to obtain a tag of the third audio commentary data, insert the tag of the third audio commentary data to a predetermined position in the mobile media information, and present the mobile media information with the tag of the third audio commentary data being inserted into.

The audio data play unit 403 is further to invoke the third audio commentary data corresponding to the tag thereof, and play the third audio commentary data.

In an example, a fourth audio commentary unit 407 is further included. The fourth audio commentary unit 407 is to collect fourth audio commentary data when the user listens to the second audio commentary data, and transmit the fourth audio commentary data.

The mobile media information presentation unit 402 is further to obtain a tag of the fourth audio commentary data, insert the tag of the fourth audio commentary data to a predetermined position in the mobile media information, and present the mobile media information with the tag of the fourth audio commentary data being inserted into.

The audio data play unit 403 is further to invoke the fourth audio commentary data corresponding to the tag thereof, and play the fourth audio commentary data.

In a specific example, the audio data collection unit 401 is to collect audio data associated with the mobile media information, and transmit the audio data to a mobile voice platform which is to store the audio data and generate a tag corresponding to the audio data; the mobile media information presentation unit 402 is to obtain the tag corresponding to the audio data from the mobile voice platform, insert the tag to a predetermined position in the mobile media information, and present the mobile media information with the tag being inserted into; and the audio data play unit 403 is to invoke the audio data corresponding to the tag from the mobile voice platform according to a trigger operation issued when a user browses the mobile media information, and play the audio data.

In an example, a first audio commentary unit 404 is further included. The first audio commentary unit 404 is to collect first audio commentary data when the user browses the mobile media information, and transmit the first audio commentary data to a mobile voice database of the mobile voice platform for storage, and the mobile vice platform is to generate the tag of the first audio commentary data.

The mobile media information presentation unit 402 is further to obtain the tag of the first audio commentary data, insert the tag of the first audio commentary data to a predetermined position in the mobile media information, and present the mobile media information with the tag of the first audio commentary data being inserted into.

The audio data play unit 403 is further to invoke the first audio commentary data corresponding to the tag thereof from the mobile voice database, and play the first audio commentary data.

In an example, a second audio commentary unit 405 is further included.

The second audio commentary unit 405 is to collect second audio commentary data when the user listens to the audio data, and transmit the second audio commentary data to a mobile voice database of the mobile voice platform for storage, and the mobile vice platform is to generate the tag of the second audio commentary data.

The mobile media information presentation unit 402 is further to obtain the tag of the second audio commentary data, insert the tag of the second audio commentary data to a predetermined position in the mobile media information, and present the mobile media information with the tag of the second audio commentary data being inserted into.

The audio data play unit 403 is further to invoke the second audio commentary data corresponding to the tag thereof from the mobile voice database, and play the second audio commentary data.

In an example, a third audio commentary unit 406 is further included. The third audio commentary unit 406 is to collect third audio commentary data when the user listens to the first audio commentary data, and transmit the third audio commentary data to a mobile voice database of the mobile voice platform for storage, and the mobile vice platform is to generate the tag of the third audio commentary data.

The mobile media information presentation unit 402 is further to obtain the tag of the third audio commentary data, insert the tag of the third audio commentary data to a predetermined position in the mobile media information, and present the mobile media information with the tag of the third audio commentary data being inserted into.

The audio data play unit 403 is further to invoke the third audio commentary data corresponding to the tag thereof from the mobile voice database, and play the third audio commentary data.

In an example, a fourth audio commentary unit 407 is further included. The fourth audio commentary unit 407 is to collect fourth audio commentary data when the user listens to the second audio commentary data, and transmit the fourth audio commentary data to a mobile voice database of the mobile voice platform for storage, and the mobile vice platform is to generate the tag of the fourth audio commentary data.

The mobile media information presentation unit 402 is further to obtain the tag of the fourth audio commentary data, insert the tag of the fourth audio commentary data to a predetermined position in the mobile media information, and present the mobile media information with the tag of the fourth audio commentary data being inserted into.

The audio data play unit 403 is further to invoke the fourth audio commentary data corresponding to the tag thereof from the mobile voice database, and play the fourth audio commentary data.

In an example, the audio data collection unit 401 is to collect the audio data of an event principal associated with the mobile media information, to collect the audio data of a person involved in an event associated with the mobile media information, to collect the audio data of an event observer associated with the mobile media information, and/or to collect the audio data of an event analyst associated with the mobile media information.

In an example, the mobile media information includes text information, picture media information, video media information, audio media information or etc.

In an example, the audio data collection unit 401 is to enable an audio recording application of a mobile terminal to collect audio data associated with the mobile media information, and enable the audio recording application of the mobile terminal to use an open interface of a mobile voice platform and store the audio data in a mobile voice database of the mobile voice platform which is to generate a tag of the audio data based on a content of the mobile media information.

Based on the above examples, an example of the present application also proposes an apparatus for processing mobile voices.

Figure 5:
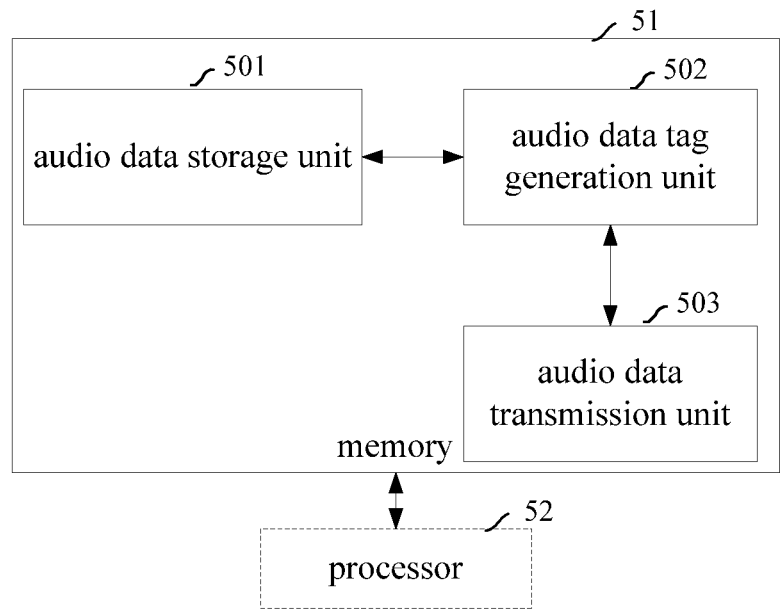
FIG. 5 is diagram of an apparatus for processing mobile voices according to an example of the present application.

FIG. 5 is a structural diagram of an apparatus for processing mobile voices according to an example of the present application.

As shown in FIG. 5, an audio data storage unit 501, an audio data tag generation unit 502 and an audio data transmission unit 503 are included therein.

The audio data storage unit 501 is to receive audio data associated with mobile media information, and stores the audio data.

The audio data tag generation unit 502 is to generate a tag corresponding to the audio data and transmit the tag, where the tag is to be inserted to a predetermined position in the mobile media information and presented together with the mobile media information.

The audio data transmission unit 503 is to receive a search request for audio data carrying a tag of audio data, search the audio data corresponding to the tag carried in the search request, and transmit the audio data searched out.

In an example, the audio data storage unit 501 is further to receive first audio commentary data collected when the user browses the mobile media information or second audio commentary data collected when the user listens to the audio data, and store the first audio commentary data or the second audio commentary data.

In an example, the audio data storage unit 501 is further to receive third audio commentary data collected when the user listens to the first audio commentary data or fourth audio commentary data collected when the user listens to the second audio commentary data, and store the third audio commentary data or the fourth audio commentary data.

Based on the above examples, an example of the present application also proposes a system for presenting mobile media information.

Figure 6:
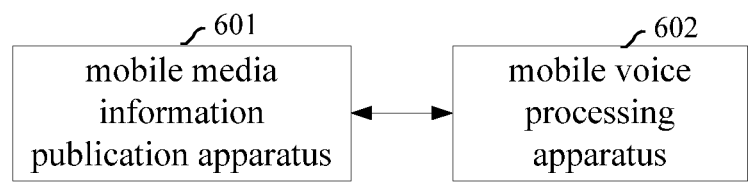
FIG. 6 is a structural diagram of a system for presenting mobile media information according to an example of the present application.

FIG. 6 is a structural diagram of a system for presenting mobile media information according to an example of the present application.

As shown in FIG. 6, a mobile media information publication apparatus 601 and a mobile voice processing apparatus 602 are included therein.

The mobile media information publication apparatus 601 is to collect audio data associated with mobile media information, and transmit the audio data to the mobile voice processing apparatus 602.

The mobile voice processing apparatus 602 is to store the audio data, and generate a tag corresponding to the audio data.

The mobile media information publication apparatus 601 is further to obtain the tag corresponding to the audio data from the mobile voice processing apparatus 602, insert the tag of the audio data to a predetermined position in the mobile media information, present the mobile media information with the tag of the audio data being inserted into, invoke the audio data corresponding to the tag thereof from the mobile voice processing apparatus 602 according to a trigger operation issued when the user browses the mobile media information, and play the audio data.

In an example, the mobile media information publication apparatus 601 is to collect the audio data associated with the mobile media information, and use an open interface of the mobile voice processing apparatus 602 to transmit the audio data to the mobile voice processing apparatus 602.

The mobile voice processing apparatus 602 is to store the audio data in a mobile voice database located therein, and generate a tag corresponding to the audio data based on the content of the mobile media information.

In practice, the method and apparatus provided by the examples of the present application may be implemented through various ways. For example, the method may be implemented as a plug-in program installed in a mobile device through an API according to certain specifications, or may be implemented as an encapsulated application program which is provided to be downloaded by the user. On the condition of the method is implemented as the plug-in program, it may be implemented as various plug-in programs such as ocx, dll, cab, Flash plug-in, RealPlayer plug-in, MMS plug-in, MIDI staff plug-in, ActiveX plug-in or etc.

The method provided by the examples of the present application may be implemented as instructions or instruction sets stored in various storage mediums including but not limited to a floppy disk, an optical disk, DVD, a hard disk, a flash memory, a U disk, a CF card, an SD card, an MMC card, an SM card, a memory stick, an xD card or the like.

In addition, the method provided by the examples of the present application may be applied to the storage medium based on Nand flash, such as a U disk, a CF card, an SD card, an SDHC card, an MMC card, an SM card, a memory stick, an xD card or etc.

As described above, in the examples of the present application, the audio data associated with the mobile media information is collected and is stored in the mobile voice platform, and a tag corresponding to the audio data is generated; and the tag is inserted to a predetermined position in the mobile media information which is then presented; and according to an trigger operation issued when the user browses the mobile media information, the audio data corresponding to the tag is invoked from the mobile voice platform, and is played. Thus, the examples of the present application provide a technical solution combining the mobile media information with the mobile voice platform, so that the audio can be embedded in the mobile media information more properly, the interaction manner of the content of the media information is enriched, thereby increasing the immediacy and interactivity of the mobile media.

In addition, the mobile media information may be of various types such as news information, videos, e-commerce data and the like, through the interaction between the mobile terminal and the mobile voice platform information, the combination of the voice audio and the mobile media information can be more natural and convenient.

Furthermore, the examples of the present application can be applied to various terminals and can be used cross platforms and across terminals, which has a wide application range.

The systems, apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description will be made as to the various embodiments in conjunction with the accompanying drawings in FIGS. 1-6. It should be understood that specific embodiments described herein are merely intended to explain the present disclosure, but not intended to limit the present disclosure. In accordance with the purposes of this disclosure, as embodied and broadly described herein, this disclosure, in one aspect, relates to method and apparatus for managing an identity for a mobile terminal.

Examples of terminal devices or mobile device or mobile terminals that can be used in accordance with various embodiments include, but are not limited to, a Personal Computer (PC), a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones running the Android operating system, the Blackberry operating system, or the Symbian operating system), an e-reader (including, but not limited to, Amazon Kindle and Barnes & Noble Nook), a laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to one skilled in the art.

A machine-readable storage medium is also provided, which is to store instructions to cause a machine such as the computing device to execute one or more methods as described herein. Specifically, a system or apparatus having a storage medium that stores machine-readable program codes for implementing functions of any of the above examples and that may make the system or the apparatus (or CPU or MPU) read and execute the program codes stored in the storage medium.

Therefore, the apparatus shown in FIG. 4 may include a memory 41 and a processor 42, the memory 41 stores instructions executable for the processor 42. The memory 41 may include the units 401~407, and through executing the instructions read from the units 401~407, the processor 42 can accomplish the functions of the units 401~407 as mentioned above. Therefore, an apparatus for presenting mobile media information including a memory and a processor is provided, where the memory stores instruction units executable for the processor, and the instruction units include the above units 401~407. In addition, the apparatus shown in FIG. 5 may include a memory 51 and a processor 52, the memory 51 stores instructions executable for the processor 52. The memory 51 may include the units 501~503, and through executing the instructions read from the units 501~503, the processor 52 can accomplish the functions of the units 501~503 as mentioned above. Therefore, an apparatus for processing mobile voices including a memory and a processor is provided, where the memory stores instruction units executable for the processor, and the instruction units include the above units 501~503.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer (namely a computing device), at least part of the operations performed by the program codes may be implemented by an operation system running in a computer following instructions based on the program codes to realize a technical scheme of any of the above examples.

In addition, the program codes implemented from a storage medium are written in storage in an extension board inserted in the computer or in storage in an extension unit connected to the computer. In this example, a CPU in the extension board or the extension unit executes at least part of the operations according to the instructions based on the program codes to realize a technical scheme of any of the above examples.

The above description just shows several examples of the present disclosure in order to present the principle and implementation of the present application, and is in no way intended to limit the scope of the present application. Any modifications, equivalents, improvements and the like made within the spirit and principle of the present application should be encompassed in the scope of the present application.

What is claimed is:

1. A method of presenting mobile media information via a social networking chat platform including a remote server, a first mobile terminal running a mobile application associated with a first user, and a second mobile terminal running a mobile application associated with a second user, the method comprising:
    at the first mobile terminal:
        while presenting media content through the mobile application, detecting pressing of a button displayed in the mobile application;
        in response to and while detecting the pressing:
            pausing presentation of the media content; and
            collecting, by an audio collection unit of the first mobile terminal, audio data from the first user to be associated with the media content;
        upon detecting release of the button, transmitting the audio data to the remote server that stores the audio data and generates a tag corresponding to the audio data, wherein the tag uniquely identifies the audio data and is to be presented together with the media content at the second mobile terminal running the mobile application, the first and second users having a social relationship on the social networking chat platform;
    at the second mobile terminal:
        obtaining the tag from the remote server;
        inserting the tag into a predetermined position in the mobile application;
        detecting a user selection of the tag displayed in the mobile application, wherein selection of the tag at the second mobile terminal causes the remote server to provide the audio data to the second mobile terminal; and
        playing the received audio data through the mobile application.

2. The method of claim 1, wherein the tag is presented adjacent to the media content at the second mobile terminal.

3. The method of claim 2, wherein the tag is represented as an audio control affordance at the second mobile terminal.

4. The method of claim 1, wherein:
    collecting the audio data to be associated with the media content comprises recording the audio data through the mobile application; and
    transmitting the audio data to the remote server is performed through the mobile application by using an open interface of the remote server.

5. The method of claim 4, wherein the remote server generates the tag of the audio data according to content of the media content.

6. The method of claim 1, further comprising:
    at the second mobile terminal:
        collecting, by an audio collection unit of the second mobile terminal, second audio data from the second user to be associated with the media content; and
        transmitting the second audio data to the remote server that stores the second audio data and generates a second tag corresponding to the second audio data, wherein the second tag uniquely identifies the second audio data and is to be presented together with the media content at the first mobile terminal running the mobile application.

7. The method of claim 6, wherein:
the audio content is public to users of the social networking chat platform; and
the second audio content is a private communication between specific users of the social networking chat platform.

8. A system for a social networking chat platform comprising:
a remote server;
a first mobile terminal, associated with a first user, configured to:
 detect pressing of a button displayed in a mobile application running on the first mobile terminal while presenting media content through the mobile application;
 in response to and while detecting the pressing:
  pause presentation of the media content; and
  collect, by an audio collection unit of the first mobile terminal, audio data from the first user to be associated with the media content; and
 upon detecting release of the button, transmit the audio data to the remote server that stores the audio data and generates a tag corresponding to the audio data, wherein the tag uniquely identifies the audio data and is to be presented together with the media content at a second mobile terminal, associated with a second user, running the mobile application, the first and second users having a social relationship on the social networking chat platform;
the second mobile terminal configured to:
 obtain the tag from the remote server;
 insert the tag into a predetermined position in the mobile application;
 detect a user selection of the tag displayed in the mobile application, wherein selection of the tag at the second mobile terminal causes the remote server to provide the audio data to the second mobile terminal; and
 play the received audio data through the mobile application.

9. The system of claim 8, wherein the tag is presented adjacent to the media content at the second mobile terminal.

10. The system of claim 9, wherein the tag is represented as an audio control affordance at the second mobile terminal.

11. The system of claim 8, wherein:
collecting the audio data to be associated with the media content comprises recording the audio data through the mobile application; and
transmitting the audio data to the remote server is performed through the mobile application by using an open interface of the remote server.

12. The system of claim 11, wherein the remote server generates the tag of the audio data according to content of the media content.

13. The system of claim 8, wherein
the second mobile terminal is further configured to:
 collect, by an audio collection unit of the second mobile terminal, second audio data from the second user to be associated with the media content; and
 transmit the second audio data to the remote server that stores the second audio data and generates a second tag corresponding to the second audio data, wherein the second tag uniquely identifies the second audio data and is to be presented together with the media content at the first mobile terminal running the mobile application.

14. The system of claim 13, wherein:
the audio content is public to users of the social networking chat platform; and
the second audio content is a private communication between specific users of the social networking chat platform.

15. A non-transitory computer-readable storage medium, storing one or more programs configured for execution by one or more processors of a first mobile terminal that includes an audio collection unit, the one or more programs including instructions for:
while presenting media content through a mobile application running on the first mobile terminal, detecting pressing of a button displayed in the mobile application, the mobile application being associated with a social networking chat platform;
in response to and while detecting the pressing:
 pausing presentation of the media content; and
 collecting, by the audio collection unit, audio data from the first user to be associated with the media content;
upon detecting release of the button, transmitting the audio data to a remote server, associated with the social networking chat platform, that stores the audio data and generates a tag corresponding to the audio data, wherein the tag uniquely identifies the audio data and is to be presented together with the media content at a second mobile terminal, associated with a second user, running the mobile application, the first and second users having a social relationship on the social networking chat platform;
wherein the second mobile terminal is configured to:
 obtain the tag from the remote server;
 insert the tag into a predetermined position in the mobile application;
 detect a user selection of the tag displayed in the mobile application, wherein selection of the tag at the second mobile terminal causes the remote server to provide the audio data to the second mobile terminal; and
 play the received audio data through the mobile application.

16. The non-transitory computer-readable storage medium of claim 15, wherein the tag is presented adjacent to the media content at the second mobile terminal.

17. The non-transitory computer-readable storage medium of claim 16, wherein the tag is represented as an audio control affordance at the second mobile terminal.

18. The non-transitory computer-readable storage medium of claim 15, wherein:
collecting the audio data to be associated with the media content comprises recording the audio data through the mobile application; and
transmitting the audio data to the remote server is performed through the mobile application by using an open interface of the remote server.

19. The non-transitory computer-readable storage medium of claim 18, wherein the remote server generates the tag of the audio data according to content of the media content.

20. The non-transitory computer-readable storage medium of claim 15, wherein
the second mobile terminal is further configured to:

collect, by an audio collection unit of the second mobile terminal, second audio data from the second user to be associated with the media content; and transmit the second audio data to the remote server that stores the second audio data and generates a second tag corresponding to the second audio data, wherein the second tag uniquely identifies the second audio data and is to be presented together with the media content at the first mobile terminal running the mobile application.

* * * * *